United States Patent [19]

Kita

[11] 4,182,165
[45] Jan. 8, 1980

[54] FLUID FLOW RATE MEASURING APPARATUS

[75] Inventor: Toru Kita, Yokohama, Japan

[73] Assignee: Nissan Motor Co., Limited, Japan

[21] Appl. No.: 913,069

[22] Filed: Jun. 6, 1978

[30] Foreign Application Priority Data

Jun. 13, 1977 [JP] Japan .................................. 52/68879

[51] Int. Cl.² ............................................... G01F 1/32
[52] U.S. Cl. ............................................... 73/194 VS
[58] Field of Search ................................... 73/194 VS

[56] References Cited

U.S. PATENT DOCUMENTS 3,564,915  2/1971  Tomota et al. ..................... 73/194

3,732,731  5/1973  Fussell, Jr. ........................... 73/194

FOREIGN PATENT DOCUMENTS 48-20553  3/1973  Japan ................................... 73/194

*Primary Examiner*—Herbert Goldstein
*Attorney, Agent, or Firm*—Robert E. Burns; Emmanuel J. Lobato; Bruce L. Adams

[57] ABSTRACT

A semi-cylindrical body member with a flat section is disposed in a fluid flow conduit in an arrangement to allow the surface of the flat portion to face upstream. Means for counting the number of Karman vortexes created by the body member under flowing of the fluid is disposed in the body member.

13 Claims, 15 Drawing Figures

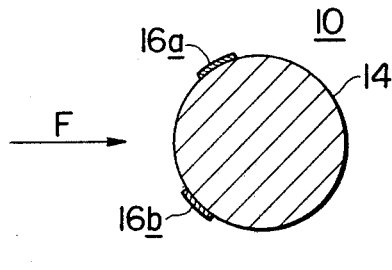
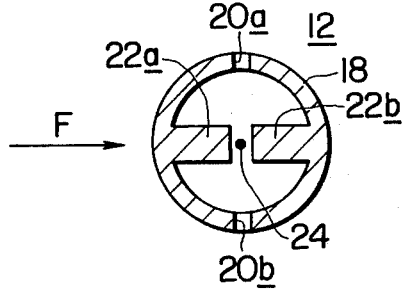
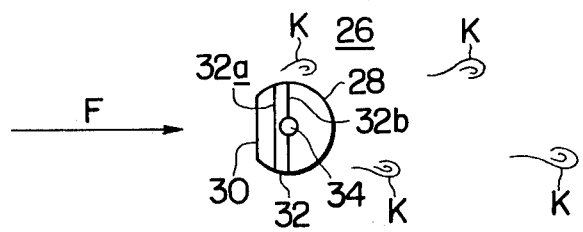
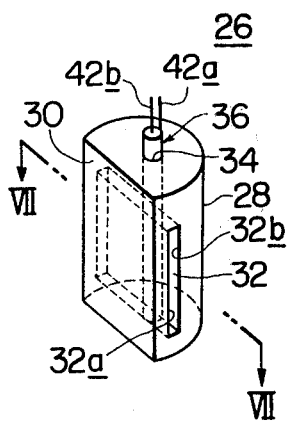
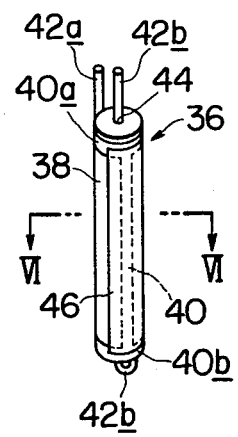
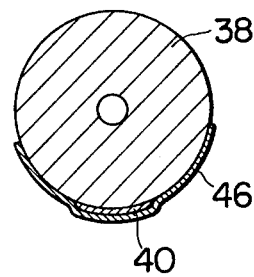

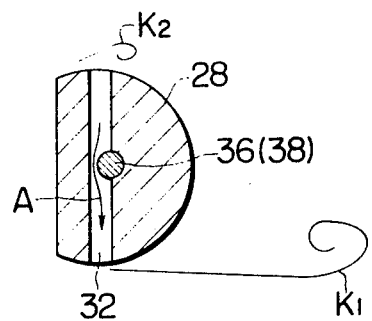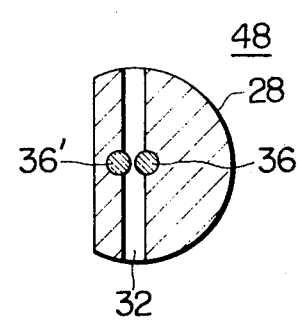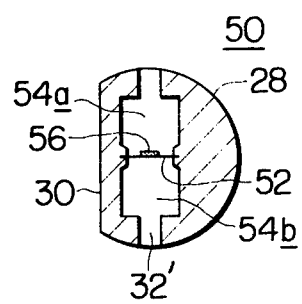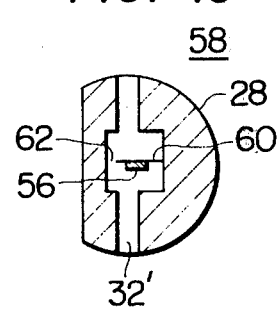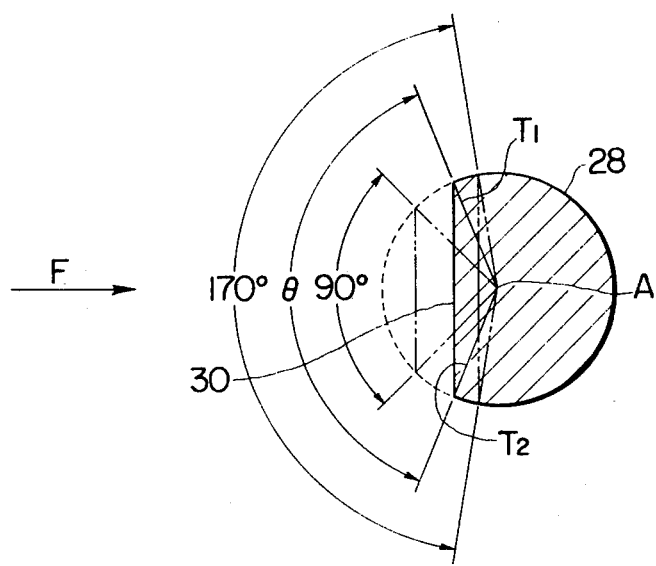

FLOW RATE······12 l/sec
FLOW SPEED······10 m/sec

FLOW RATE······50 l/sec
FLOW SPEED······41 m/sec

FLOW RATE······12 l/sec
FLOW SPEED······10 m/sec

FLOW RATE······50 l/sec
FLOW SPEED······41 m/sec

FLUID FLOW RATE MEASURING APPARATUS

The present invention relates in general to a mass flow rate measuring apparatus and more particularly to a detector section of such apparatus to which the theory "Karman vortex street" is practically applied.

It is known to those skilled in the art that, under certain conditions, a "Karman vortex street" is shed in the wake of bluff cylindrical bodies when a flow of fluid is perpendicular to the generators of the cylinder. The shedding of vortexes occurs periodically first from one side of the body and then from the other in accordance with the velocity of the flow. Thus, by counting the number of the vortexes created by the body in a unit time, the flow rate of the fluid can be measured.

It is an object of the present invention to provide an improved detector section of a fluid flow rate measuring apparatus which puts the theory "Karman vortex street" into practical use.

It is another object of the present invention to provide a detector section of a fluid flow rate measuring apparatus which can measure the flow rate of air or the like accurately.

It is still another object of the present invention to provide a fluid flow rate measuring apparatus the responsiveness of which to fluid flow variations is greatly improved.

It is a further object of the present invention to provide a detector section of a fluid flow rate measuring apparatus the mechanical strength of which is also improved.

Other objects and advantages of the present invention will become clear from the following description when taken in conjunction with the accompanying drawings, in which:

FIGS. 1 and 2 are sketches respectively showing, but in a sectional manner, detector sections of conventional fluid flow rate measuring apparatus which put the "Karman vortex street" theory into practical use;

FIG. 3 is a sketch for explaining the principle of operation of a detector section of the fluid flow rate measuring apparatus of the subject invention;

FIG. 4 is an enlarged schematic perspective view of the detector section of the fluid flow rate measuring apparatus of the invention;

FIG. 5 is an enlarged schematic perspective view of an element used in the detector section of FIG. 4;

FIG. 6 is a sectional view taken on the line VI—VI of FIG. 5;

FIG. 7 is a sectional view taken on the line VII—VII of FIG. 4;

FIGS. 8 and 10 are sectional views similar to FIG. 7, but show alternative embodiments of the detector section of the invention;

FIG. 11 is a sketch for explaining the configuration of a flat section formed on the detector section of the invention.

Figure 12A:
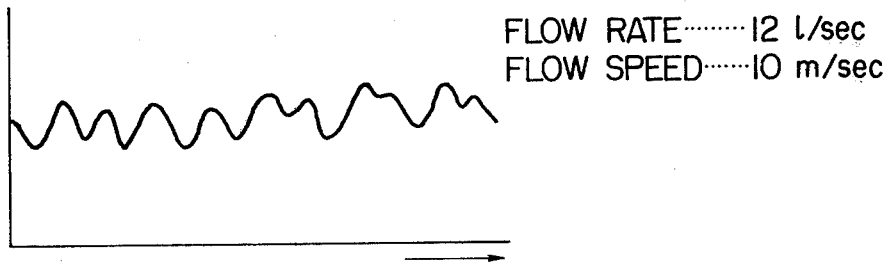
FIGS. 12A to 13B are sketches of waveforms explaining the results of prior art detector section and the improved detector section of the invention, respectively.

Prior to making a description of a detector section of the fluid flow rate measuring apparatus of the invention, explanation of the prior art detector section using the "Karman vortex street" theory will be given by the aid of FIGS. 1 and 2 in order to clarify the inventive steps of the subject invention.

FIGS. 1 and 2 respectively illustrate detector sections 10 and 12 of conventionally used fluid flow rate measuring apparatus.

The detector section 10 of FIG. 1 generally comprises a vortex shedding body 14 in the form of cylinder, and two longitudinally extending laminated metals 16a and 16b attached to the cylindrical surface of the body 14 spaced from each other.

The detector section 12 of FIG. 2 comprises a vortex shedding body 18 in the form of hollow cylinder with diametrically opposed two openings 20a and 20b, two partition walls 22a and 22b extending from diametrically opposed respective inner surfaces of the body 18 to form a clearance between the respective leading ends thereof, and a wire 24 axially extending through the body 18.

These detector sections 10 and 12 of the above will create vortexes periodically at one sides thereof and then at the other sides when disposed in a path of fluid flow flowing in the direction of arrow F.

In operation, the laminated metals 16a and 16b or the wire 24 are supplied with constant current from an electric power source (not shown) to be heated. However, under flowing of the fluid, the heated metals 16a and 16b or the wire 24 are cooled in proportion to the velocity of the shedded vortexes from the body 14 or 18 to change or decrease the electric resistance thereof, resulting in a drop of voltage supplied to the metals 16a and 16b or the wire 24. The voltage variation depends on the vortex shedding frequency which in turn depends on the relative fluid velocity which is to be measured. Thus, the fluid flow amount in a unit time can be calculated or measured.

With the above-mentioned two detector sections of the conventional mass flow measuring apparatus, however, the following drawbacks are encountered:

First, each vortex created by the body 14 or 18 fails to have sufficient energy to effectively cool the heated laminated metals 16a and 16b or the wire 24 because of the unsuitable configuration of the body 14 or 18.

Second, energy of the vortexes created from respective sides of the body 14 or 18 lacks uniformity to make the voltage variation quite unstable. This phenomenon becomes most critical when a large amount of fluid is subjected to measurement.

Third, in case of the detector section 10 of FIG. 1, the temperature drop in the metals 16a and 16b caused by the flowing of the fluid per se is considerable relative to that by the shedded vortexes per se since the metals 16a and 16b are directly exposed to the fluid, thus causing the generation of noise on the apparatus.

These mean that accurate mass flow rate measurement is not expected by the above-mentioned conventional detector sections.

Although improved responsiveness may be given by thinning the laminated metals 16a and 16b or the wire 24, this measure will cause inevitably poor mechanical strength which induces undesired breakage of the metals and the wire upon operation. In fact, in case of the detector section 10 of FIG. 1, the laminated metals 16a and 16b are directly attacked by hard dust particles contained in the fluid since they are directly exposed to the fluid, as shown.

Accordingly, the present invention contemplates to eliminate the several drawbacks encountered in the conventional detector sections of the fluid flow rate measuring apparatus mentioned above.

Referring now to FIGS. 3 to 7, especially to FIG. 3, there is schematically illustrated a detector section 26 of a fluid flow rate measuring apparatus according to the invention, as being disposed in the path of fluid flowing in a conduit tube 27 in the direction of the arrow F. As is best seen from FIG. 4, the detector section 26 comprises an insulating semi-cylindrical body 28 having thereon a flat portion 30 which extends longitudinally along the axis of the body 28. A through slit 32 is formed in the body 28 to diametrically extend from a section of the cylindrical surface of the body 28 to the other. It should be noted that opposed flat surfaces 32a and 32b which define front and rear walls of the slit 32 are parallel with each other and also parallel with the surface of the flat portion 30, as shown. The body 28 is further formed with an axially extending through hole 34 which is merged at its generally middle section with the through slit 32.

Disposed in the through hole 34 is a vortex counting element or vortex transducer element or transducer means 36 which comprises, as shown in detail in FIG. 5, a cylindrical rod member 38 constructed of insulating material such as ceramics, glass or alumina. As is best seen from FIG. 7, the rod member 38 is arranged in the body 28 to project into the substantially middle section of the slit 32 while forming a limited clearance between the most projected end thereof and the front surface 32a of the slit 32. A laminated metal strip 40 made of platinum, nickel or tungsten is attached to or coated on the cylindrical surface of the rod member 38 to longitudinally extend therealong. The strip 40 is formed at either ends thereof with ring portions 40a and 40b respectively disposed about upper and lower ends of the rod member 38. Radio frequency (RF) spattering method or vacuum evaporation method may be used for forming the laminated metal strip 40 on the rod member 38. Preferably, the thickness of the metal strip 40 ranges from about 2 $\mu$m to about 5 $\mu$m. Two lead wires 42a and 42b are respectively connected to the ring portions 42a and 42b. As best seen in FIG. 5, the lead wire 42b passes through an axially extending hole 44 formed in the rod member 38 for connection with the lower ring portion 40b. The metal strip 40 is covered by an about 0.5 to 1 $\mu$m insulating film 46 constructed of ceramics or silica glass, in a manner as shown in FIG. 6. It should be noted that the film 46 is made by a material the heat conductivity of which is considerably lower than that of the selected material of the rod member 38.

The vortex counting element 36 having the above-mentioned construction is disposed in the through hole 34 of the body 28 to allow the metal strip 40 to face or open to the through slit 32, preferably in a manner that an imaginary plane containing both the axis of the rod member 38 and an imaginary line longitudinally dividing the metal strip 40 evenly is substantially perpendicular to the surface of the flat portion 30 of the body 28.

As will be well understood from FIG. 3, the detector section 26 is such arranged that the flat portion 30 of the body 28 faces upstream. More specifically, the body 28 is arranged in a manner that the surface of the flat portion 30 is substantially perpendicular to the direction (F) of the fluid flow. With this arrangement, the "Karman vortexes" (denoted by references K) are effecting shed periodically in the wake of the body 28 under flowing of the fluid, as shown.

In FIG. 11, there is shown a sectional view of the body 28 for explaining a desired shape of the same. In this drawing, $T_1$ denotes an imaginary plane including both the axis A of the body 28 and one side edge of the flat section 30, and $T_2$ denotes another imaginary plane including both the axis A and the other side edge of the flat section 30. Experiments have revealed that the vortex shedding phenomenon becomes quite stable when the formation of the flat section 30 is such made that an angle $\theta$ defined by the imaginary planes $T_1$ and $T_2$ is about 90° to about 170°.

In operation, the metal strip 40 is supplied with constant current via the lead wires 42a and 42b from a conventional electric power source (not shown) to be heated. As viewed in FIG. 3, flowing of fluid in the direction of F creates vortexes K periodically in the wave of the body 28. The periodic shedding of vortexes occurs first from one side of the flat portion 30 and then from the other resulting in that fluid flow occurs in the through slit 32 in one and reverse directions, alternatively. The fluid in the slit 32 changes its flowing direction upon shedding of vortexes from the body 28 in a manner that, as shown in FIG. 7, the fluid begins to flow in the direction of A when the vortex $K_1$ created at one side of the body 28 has just been shed from the body 28. The alternative fluid flows in the slit 32 cool the heated metal strip 40 to provide lowering of the electric resistance of the metal strip 40 with a result of drop of voltage supplied to the metal strip 40. As has been described hereinbefore, the voltage variations thus created are dependent upon the vortex shedding frequency which in turn depends on the relative fluid velocity which is to be measured. Thus, the fluid flow amount in a unit time, that is flow rate of the fluid, can be measured by using a conventional calculating device (not shown).

Experiments on the above mentioned detector section 26 have revealed the following good results:

1. The formation of the flat section 30 permits each vortex to have energy sufficient enough to cool the metal strip 40 even when the velocity of the fluid flow is low.

2. The projection of the rod member 36 into the slit 32 causes a slight flow resistance against the fluid flow created in the passage of the slit 32. This induces, however, that any tiny high frequency wave vortexes created in the vicinity of the edges of the slit 32, which may produce noises in flow in the slit 32, are diminished. Thus, the temperature variation of the metal strip 40 is substantially caused by the fluid flow produced by only the "Karman vortexes."

3. The location of the metal strip 40 in the through slit 32 prevents the strip 40 from being directly attacked by dust particles in the fluid flow travelling through the conduit tube 27.

4. The about 0.5 to 1 $\mu$m insulating film 46 covering the metal strip 40 greatly improves the mechanical strength of the strip 40 without sacrificing the sensing ability of the metal strip 40.

Referring to FIG. 8, there is illustrated a modification of the detector section, as being denoted by numeral 48. In this modification, an additional vortex counting element 36' having substantially the same construction as the element 36 is further employed. As shown, the additional element 36' is disposed in the body 28 at a position opposite to the element 36 with respect to the slit so as to form a limited clearance of the slit 32 therebetween. These elements 36 and 36' are connected in series electrically. With this, the sensitivity of the detector section 48 to the fluid flow rate variation is considerably improved in comparison with the before-mentioned one of FIG. 7. Furthermore, the unwanted tiny high frequency wave vortexes which may cause the noise on the output of the detector section can be completely eliminated. Although, in this modification, the additional element 36' has substantially the same construction as the element 36, it is also possible to use only a rod member (similar to the rod member 38) instead of the additional element 36' only for improving the output stability of the detector section.

Instead of using the metal strip 40 supplied with constant current as a vortex counting element as described above, it is also possible to use a pressure sensitive element, such as strain gauge, as the counting element so long as the following slight modifications are made in the semi-cylindrical body:

In FIG. 9, there is shown a detector section 50 using the pressure sensitive element as the vortex counting element. The same numerals denote substantially the same parts as in the case of FIG. 7. The detector section 50 comprises a semi-cylindrical body 28 with a flat section 30. The body 28 is formed with a slit 32' which is enlarged at the middle section thereof. A thin partition plate 52 or diaphragm is sealingly disposed in the enlarged section of the slit 32' to divide the same into two sections 54a and 54b which are identical with each other. A strain gauge 56 is attached to the thin plate 52 to convert the pressure variations supplied to the thin plate 52 into electric resistance variations in response to shedding of the vortexes from the body 28. Thus, by using a conventional calculating device (not shown), the fluid flow amount in a unit time, that is flow rate of the fluid, can be measured from the resistance variations. Instead of the strain gauge 56, other materials such as a pressure-activated diode and a pressure-activated transistor may be used.

In FIG. 10, another detector section 58 is illustrated, which uses a vibrating plate 60 as a substitute for the thin partition plate 52 of FIG. 9. It should be noted that a clearance 62 is formed between the leading end of the vibrating plate 60 and the wall of the enlarged section of the slit 32' to assure optimal vibrating motions of the plate 60. A strain gauge 56 or other materials such as the pressure activated diode or a pressure activated transistor is attached to the vibrating plate 60 for measurement of the fluid flow rate.

Figure 12B:
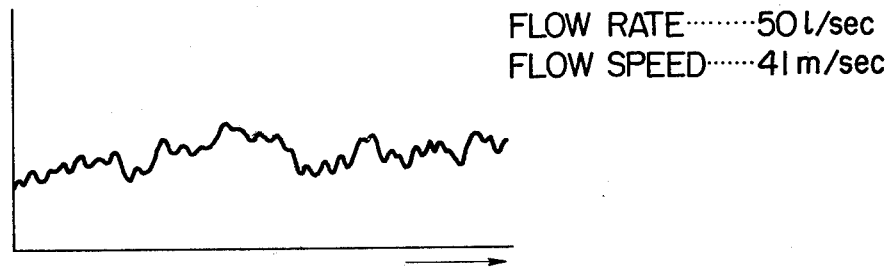
Figure 13A:
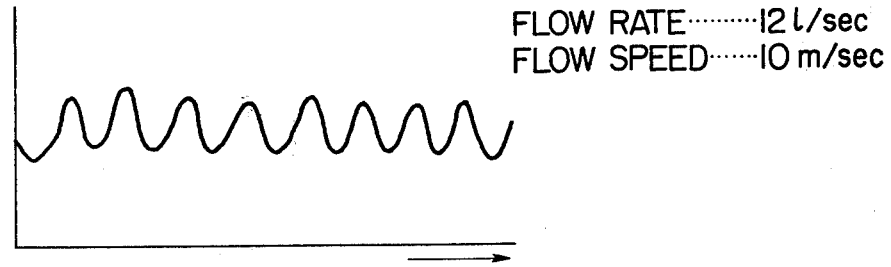
Figure 13B:
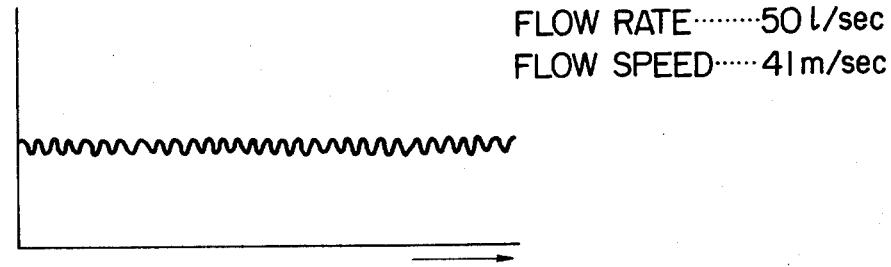

FIGS. 12A and 12B and FIGS. 13A and 13B show respective waveforms explaining the results of the prior art detector section and the improved detector section of the invention, in which FIGS. 12A and 13A are data taken under a test condition in which fluid flow rate is 12 l/sec and fluid flow speed is 10 m/sec, and FIGS. 12B and 13B are data taken under a condition in which fluid flow rate is 50 l/sec and fluid flow speed is 41 m/sec. As will be well understood from these figures, the detector section of the invention produces quite stable waveforms even under different flowing modes of the fluid in comparison with the prior art one. Especially, big improvement is acknowledged when a large amount of mass is subjected to measurement.

With the above, it will be appreciated that the detector section of the mass flow rate measuring apparatus of the invention can measure the flow rate of fluid such as air or the like accurately. This apparatus is thus quite applicable to an air induction system of automotive engines.

What is claimed is:

1. A detector section of a fluid flow rate measuring apparatus which measures a flow rate of a fluid flowing in a conduit, comprising:
   a semi-cylindrical body disposed in said conduit, said semi-cylindrical body being formed with a flat section the surface of which faces upstream and which is substantially perpendicular to the direction of flow of said fluid; and
   means for sensing the number of vortexes created by said semi-cylindrical body during flowing of said fluid in said conduit, said means for sensing including a slit through said semi-cylindrical body, extending parallel to the flat surface of said semi-cylindrical body, and vortex transducer means disposed in said through slit for converting hydrodynamical variations applied thereto into electrical parameter variations.

2. A detector section as claimed in claim 1, in which said vortex transducer element is located in the middle of said through slit.

3. A detector section as claimed in claim 2, in which said vortex transducer element is arranged to form a limited section in the middle of said through slit.

4. A detector section as claimed in claim 3, in which said vortex transducer element comprises:
   a cylindrical insulating rod longitudinally disposed in said body to project at the cylindrical surface portion thereof into said through slit while forming a limited section in said slit;
   a laminated metal strip attached to said cylindrical surface portion so as to longitudinally extend along the same; and
   an insulating film material covering said laminated metal strip.

5. A detector section as claimed in claim 4, further comprising an additional vortex transducer element which has substantially the same construction as the previously mentioned one, the additional transducer element being disposed in said through slip at a position opposite to said previously mentioned one with respect to said through slip while forming a limited clearance between the additional and previously mentioned transducers.

6. A detector section as claimed in claim 4, further comprising a cylindrical rod which is disposed in said body to project at a section thereof into the middle of said through slit to form a limited section of said through slip between the farthest projected end thereof and the farthest projected end of said cylindrical insulating rod of said vortex transducer element.

7. A detector section as claimed in claim 3, in which said vortex transducer element comprises:
   a thin plate member disposed in said through slit to vibrate in accordance with the hydrodynamical variations applied thereto; and
   a pressure sensitive element attached to said thin plate member to convert the hydrodynamical variations into corresponding electric resistance variations.

8. A detector section as claimed in claim 7, in which said thin plate member is disposed in said through slit sealing the same to act as a diaphragm.

9. A detector section as claimed in claim 1, in which said flat portion of said body is formed subtending an angle, defined by first and second imaginery planes which respectively include both the axis of said body member and one side edge of said flat section and both the axis of said body member and the other side edge of said flat section, approximately 90° to approximately 170°.

10. A detector section a fluid flow rate measuring apparatus which measures a flow rate of a fluid flowing in a conduit, comprising: a semi-cylindrical body disposed in said conduit, said semi-cylindrical body being formed with a flat section the surface of which faces upstream and which is substantially perpendicular to the direction of flow of said fluid; and means for sensing the number of vortexes created by said semi-cylindrical body during flowing of said fluid in said conduit, said flat portion of said semi-cylindrical body being formed subtending an angle, defined by first and second imaginary planes which respectively include both the axis of said body member and one side edge of said flat section and both the axis of said body member and the other side edge of said flat section, approximately 90° to approximately 170°.

11. A fluid flow rate measuring element, comprising: a generally semi-cylindrical body dimensioned for being positioned in use in a fluid flow stream and having a flat side surface portion for facing upstream relative to the fluid flow and a slit entending through said semi-cylindrical body and opening on opposite sides of said flat side surface portion of said cylindrical body; and transducer means responsive to variations in hydrodynamical conditions within the slit for converting hydrodynamical variations into variations of an electrical parameter of said transducer means when said semi-cylindrical body is positioned within a fluid flow stream with said flat side surface portion facing upstream relative to the fluid flow.

12. A fluid flow rate measuring element according to claim 11 wherein said flat side surface portion of said semi-cylindrical body subtends an arc within the range of approximately 90° to approximately 170°.

13. A fluid flow rate measuring element according to claim 11 wherein the slit through said semi-cylindrical body is symmetrical with respect to said flat side surface portion of said semi-cylindrical body and defines openings symmetrically positioned with respect to said flat side surface portion.

* * * * *